United States Patent
Krzanowski et al.

(10) Patent No.: US 8,761,037 B2
(45) Date of Patent: *Jun. 24, 2014

(54) SYSTEMS AND METHODS FOR MEASURING NETWORK PERFORMANCE

(75) Inventors: Roman Krzanowski, White Plains, NY (US); Keynam Hedayat, Newton, MA (US)

(73) Assignee: Verizon Services Corp., Ashburn, VA (US)

( * ) Notice: Subject to any disclaimer, the term of this patent is extended or adjusted under 35 U.S.C. 154(b) by 182 days.

This patent is subject to a terminal disclaimer.

(21) Appl. No.: 13/284,006

(22) Filed: Oct. 28, 2011

(65) Prior Publication Data

US 2012/0063345 A1   Mar. 15, 2012

Related U.S. Application Data

(63) Continuation of application No. 11/329,128, filed on Jan. 11, 2006, now Pat. No. 8,064,356.

(60) Provisional application No. 60/643,067, filed on Jan. 11, 2005.

(51) Int. Cl.
   *H04L 12/26* (2006.01)

(52) U.S. Cl.
   USPC ............................................ 370/252; 370/249

(58) Field of Classification Search
   USPC .......... 370/241, 241.2, 249, 249.25, 251, 252
   See application file for complete search history.

(56) References Cited

U.S. PATENT DOCUMENTS

| | | | |
|---|---|---|---|
| 4,383,315 A | 5/1983 | Torng | |
| 5,283,571 A | 2/1994 | Yang et al. | |
| 5,878,032 A | 3/1999 | Mirek et al. | |
| 6,662,223 B1 | 12/2003 | Zhang et al. | |
| 6,859,460 B1* | 2/2005 | Chen | 370/412 |
| 6,868,094 B1* | 3/2005 | Bordonaro et al. | 370/516 |
| 2002/0057702 A1 | 5/2002 | Mizukoshi | |
| 2004/0240451 A1 | 12/2004 | Lee et al. | |
| 2005/0058083 A1* | 3/2005 | Rogers | 370/252 |
| 2005/0123003 A1 | 6/2005 | Bordonaro et al. | |

OTHER PUBLICATIONS

Almes et al., "A Round-trip Delay Metric for IPPM, RFC 2681", Network Working Group, The Internet Society, 40 pages, Sep. 1999.
Babiarz, et al., "A Two-Way Active Measurement Protocol (TWAMP), (draft-hedayat-two-way-active-measurement-protocol-01.txt," http://www.ietf. org/internet-drafts/draft-hedayat-two-way-active-measurement-protocol-01.txt, 15 pages, Jul. 20, 2005.
Mills, "Simple Network Time Protocol (SNTP), RFC 1361," Network Working Group, The Internet Society, pp. 1-10, Aug. 1992.
Shalunov, et al., "One-Way Active Measurement Protocol (OWAMP), draft-ietf-ippm-owdp-08.txt," Internet Engineering Task Force (IEFT), 36 pages, May 2004.
Shalunov, et al., "One-Way Active Measurement Protocol (OWAMP), draft-ietf-ippm-owdp-11.txt," Internet Engineering Task Force (IETF), 12 pages, Nov. 9, 2004.

* cited by examiner

*Primary Examiner* — Phuc Tran

(57) ABSTRACT

In one of many possible embodiments, a system includes a session sender configured to define and transmit a sender test packet, and a session reflector communicatively coupled to the session sender. The session reflector is configured to receive the sender test packet from the session sender, determine whether the sender test packet is received by a predetermined time. Upon a determination that the sender test packet is received by the predetermined time, the session reflector is configured to define a response test packet and transmit the response test packet to the session sender. The response test packet is defined to include data for calculating at least one two-way performance metric. In some embodiments, the session reflector is configured to record information for calculating at least one one-way performance metric. In certain embodiments, a fetch client is configured to remotely retrieve the recorded information from the session reflector.

21 Claims, 7 Drawing Sheets

US 8,761,037 B2

SYSTEMS AND METHODS FOR MEASURING NETWORK PERFORMANCE

RELATED APPLICATION

The present application is a continuation of U.S. patent application Ser. No. 11/329,128, filed on Jan. 11, 2006, now U.S. Pat. No. 8,064,356 which claims priority under 35 U.S.C. §119(e) to U.S. Provisional Patent Application No. 60/643,067, filed Jan. 11, 2005, each of which is hereby incorporated by reference in its entirety.

BACKGROUND INFORMATION

Advancements in network technologies have increased the number and types of services provided over networks. Many network-based services provide guaranteed levels of service that generally stipulate a need for monitoring network performance in order to maintain or verify the guaranteed service levels. Consequently, performance monitoring technologies have been developed to measure network performance. Unfortunately, many performance monitoring technologies are proprietary to vendors and unavoidably force network service providers to rely on a specific vendor. Moreover, existing technologies dedicated to monitoring network performance are typically resource hungry. That is, the existing technologies typically impose high loads on network resources.

Other existing performance monitoring technologies require use of a control protocol to establish test sessions between network endpoints. Unfortunately, the required use of a control protocol adds overhead costs to each test session, especially when the control protocol requires in-band messages to be exchanged between network elements. Moreover, the levels of control and monitoring provided by in-band control sessions are generally limited. For example, an in-band control session is generally unable to provide information about a test session failure because the in-band control session is usually affected by the same failure.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical reference numbers designate identical or similar elements.

DETAILED DESCRIPTION OF PREFERRED EMBODIMENTS

I. Overview

Figure 1:
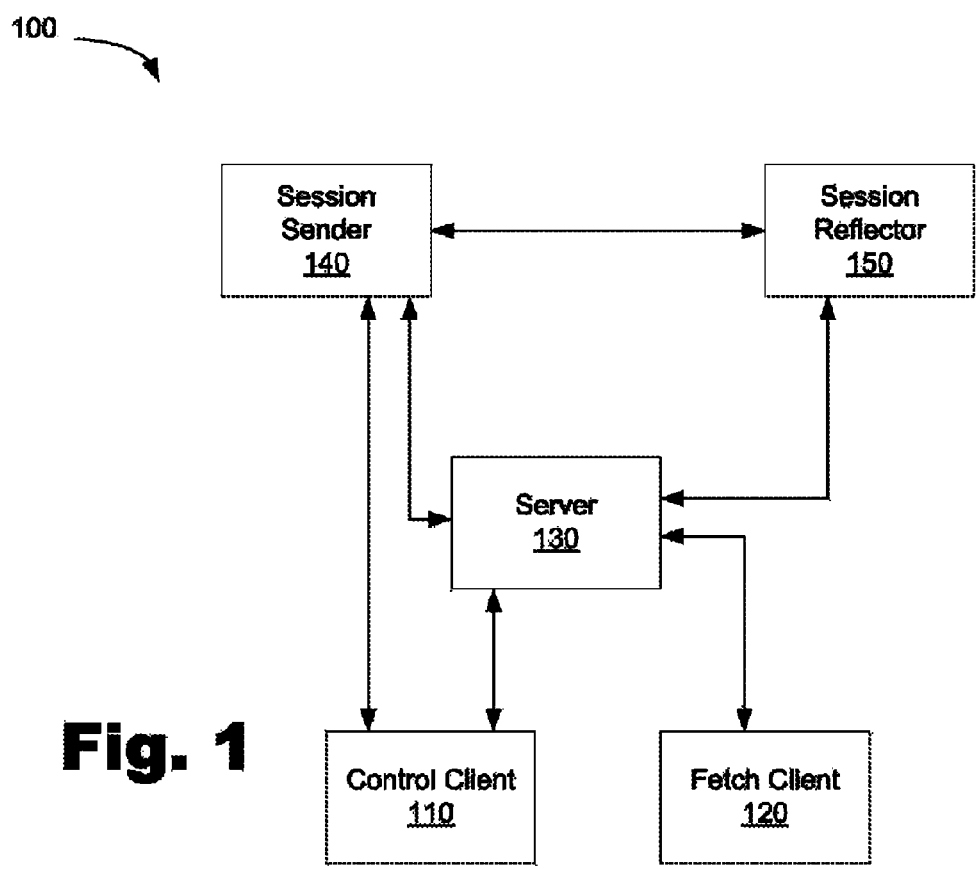
FIG. 1 is a block diagram illustrating an exemplary system for measuring network performance, according to one embodiment.

Preferred embodiments according to the present invention may be implemented as systems and methods for measuring network performance. As used herein, the term "network performance" is intended to include any information that may be descriptive of the performance of one or more segments of a network in transmitting, propagating, and/or receiving communication signals. Network performance metrics may include, but are not limited to, one-way and/or two-way delay (i.e., latency), packet loss, and jitter.

The systems and methods disclosed herein may be used to measure performance of a wide variety of different types of communication networks, including, but in no way limited to, wireless networks, cellular telephone networks, broadcast media networks, cable networks, satellite networks, television networks, Internet protocol based ("IP-based") networks, the Internet, private networks, LANs, WANs, pico-networks, and other networks capable of carrying data packets or frames.

The systems and methods disclosed herein provide for actively measuring two-way network performance, where the term two-way network performance refers broadly to the performance of roundtrip communications between network endpoints. Certain embodiments also support measurements of directional one-way network performance, where the term one-way network performance refers to the performance of one-way communications between network endpoints.

In certain embodiments, a control protocol is used to establish and control test sessions using out-of-band control messages. This provides robust control and monitoring capabilities related to test sessions. For example, an out-of-band control session is able to determine the status of a test session and/or network endpoint involved in the test session independently of the test session communication channel. Accordingly, the control session is able to identify any failure information associated with a failure of the test session or the network endpoints involved in the test session because the out-of-band control channel may continue to operate when the test session fails.

In certain embodiments, performance measurements do not require use of a control protocol to establish and perform test sessions. Rather, destination network nodes may be configured as simple reflectors capable of reflecting received test packets to the sender. This minimizes overhead associated with both test communications between network endpoints, as well as overhead associated with the implementation of performance test processes at network elements. Accordingly, lightweight performance monitoring systems and methods are provided.

Other features, advantages, and/or benefits provided by the present methods and systems will become apparent upon consideration of the following description.

II. Introduction to OWAMP

The present systems and methods for measuring network performance may incorporate features of a one-way active measurement protocol referred to as "OWAMP". OWAMP is described in "One-Way Active Measurement Protocol (OWAMP)," Stanislav Shalunov et al., October 2004, Internet Draft http://www.ietf.org/internet-drafts/draft-ietf-ippmowdp-11.txt, which is hereby incorporated by reference in its entirety. This document will be referred to herein as "the OWAMP article."

OWAMP provides capabilities for measuring one-way performance metrics over Internet Protocol "IP" networks. In short, OWAMP defines a control protocol and a test protocol that can be, used to measure performance metrics for one-way transmissions of test packets over network segments. OWAMP can be used to measure one-way performance metrics for transmissions in either direction between two network elements. The present methods and systems may be based on OWAMP and may provide capabilities for determining two-way performance metrics for round-trip transmissions of test packets over network segments.

III. Exemplary System

Turning now to the figures, FIG. 1 is a block diagram illustrating an exemplary system 100 for measuring network performance, according to one embodiment. As shown in FIG. 1, the system 100 may include a control client 110, a fetch client 120, a server 130, a session sender 140, and a session reflector 150. The arrows connecting the elements shown in FIG. 1 represent communications between the elements. Communications between the elements may be performed in any of the ways described below or in the OWAMP article, or using any known communication protocols and technologies. As discussed below, control sessions between elements may include out-of-band control messages capable of supporting robust capabilities for monitoring and controlling test sessions.

The elements shown in FIG. 1 may be implemented as software, hardware, firmware, or combinations thereof. In many embodiments, the elements shown in FIG. 1 are in the form of software or firmware modules configured to be executed on one or more computing devices. Thus, the system 100 may be implemented on more than one physical computing device, which may include any computing devices known to those skilled in the art, and may employ any of a number of computer operating systems known to those skilled in the art, including, but by no means limited to, known versions and/or varieties of the Microsoft Windows® operating system, the Unix operating system, the Linux operating system; and operating systems known for their use in network devices (e.g., switches, routers, digital subscriber line access multiplexers ("DSLAMs"), network interface devices ("NIDs"), set-top boxes, DSL modems, etc.).

Accordingly, those skilled in the art will recognize that the processes described herein may be implemented at least in part as instructions executable by one or more computing devices. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computing device (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Each of the elements shown in FIG. 1 will now be described in more detail.

A. Control Client

As shown in FIG. 1, the control client 110 may communicate with the session sender 140 and the session reflector 150 through the server 130, or the control client 110 may communicate with the session sender 140 directly or indirectly without going through the server 130. Communications with the control client 110 may be performed in any of the ways described below or in the OWAMP article (e.g., using the OWAMP control protocol), or using any other suitable communication protocols (e.g., control protocols such as Transmission Control Protocol ("TCP")) and technologies.

Control sessions may be established and maintained between the control client 110 and the server 130. The control sessions support communications of control commands and status information between the control client 110 and the server 130, including any of the control commands described herein or in the OWAMP article.

In certain embodiments, the control sessions are out-of-band communications. That is, the control sessions and associated test sessions are on different logical channels. Out-of-band control sessions provide an increased level of control over test sessions as compared to in-band control sessions. For example, when a test session or a logical endpoint of a test session fails, an out-of-band control session may be maintained and continue to support communications. This allows for identification of status information (e.g., failure information such as time of failure) even when a test session has failed. Thus, out-of-band control channels can reliably support communications independently of test sessions communication channels.

The control client 110 may be configured to initiate requests for test sessions and to trigger the start and termination of the test sessions. In particular, the control client 110 may issue request-session, start-session, and stop-session commands to initiate, start, and terminate test sessions, respectively. Accordingly, a user (e.g., a network operator, a test operator, or a service provider) may control test sessions by providing instructions to the control client 110 using any known access device(s) and interface(s).

The control client 110 may issue one or more test session requests to the server 130. Test session requests may include test schedules defining sequences and timing of test packets to be sent for respective test sessions. The test schedules may be provided and performed in any of the ways described in the OWAMP article.

The server 130 may be configured to either accept or reject the test session requests received from the control client 110, as described in the OWAMP article. Upon receipt of an affirmative response from the server 130, the control client 110 may start the requested test session by sending a start-session command to the server 130. The server 130 may be configured to accept or reject received start-session commands in any of the ways described in the OWAMP article.

In certain embodiments, the control client 110 may start a test session upon receipt of an affirmative start-session acknowledgement from the server 130. In particular, the control client 110 may instruct the session sender 140 to transmit streams of test packets to the session reflector 150. In other embodiments, upon receipt of a start-session command, the server 130 may start a test session by instructing the session sender 140 to transmit streams of test packets to the session reflector 150. Exemplary test packets that may be used in test sessions will be described below.

Either the control client 110 or the server 130 may issue a stop-session command, as described in the OWAMP article. The stop-session command may be used to prematurely terminate a test session, but more typically, the stop-session command is issued after a corresponding test session has been completed. Stop-session commands are usually issued after completion of all test sessions initiated by the control client 110 and/or the server 130.

Any control commands, timing, and formats described in the OWAMP article may be used to request, initiate, stop, monitor, and otherwise control test sessions between the session sender 140 and the session reflector 150. Further, the control commands described in the OWAMP article may be modified as described herein to support functionality associated with two-way network performance measurements. For example, control commands associated with the fetch client 120 may be modified to make optional the retrieval of one-way performance measurements from the session reflector 150, as described below.

B. Fetch Client

As shown in FIG. 1, fetch client 120 may communicate with the session sender 140 and the session reflector 150 through the server 130. Alternatively, the fetch client 120 may be configured to communicate with the session reflector 150 directly or indirectly without going through the server 130. Communications with the fetch client 120 may be performed in any of the ways described in the OWAMP article (e.g., using the OWAMP control protocol), or using any other suitable communication protocols (e.g., control protocols such as TCP) and technologies.

In certain embodiments, the fetch client 120 may be configured to initiate requests to fetch (i.e., retrieve) data descriptive of completed test sessions. For example, the fetch client 120 may remotely fetch data descriptive of one-way transmissions of test packets from the session sender 140 to the session reflector 150. The fetch client 120 may retrieve the data independently of the generation and transmission of response test packets from the session reflector 150 to the session sender 140. To initiate a fetch session, the fetch client 120 may issue a fetch-session request to the server 130. The fetch client 120 may use a connection established between the control client 110 and the server 130 to communicate with the server 130, or the fetch client 120 may establish another connection with the server 130 in any of the ways described in the OWAMP article.

With a connection established between the fetch client 120 and the server 130, the fetch client 120 may issue one or more fetch-session requests to the server 130. The server 130 may be configured to either accept or reject fetch-session requests as described in the OWAMP article. The server 130 may reject a request in embodiments in which the server 130 is not configured to handle fetch sessions or when the session reflector 150 has not recorded test session data.

When the server 130 accepts a fetch request, the server 130 may retrieve and send test session data to the fetch client 120.

Typically, the server 130 retrieves test session data from the session reflector 150, which may be configured to record data helpful for calculating performance metrics. The test session data recorded by the session reflector 150 is generally descriptive of measurements of one-way transmissions of test packets from the session sender 140 to the session reflector 150.

Fetch sessions may be optionally performed based on the type of test session requested. For example, a fetch session may be performed when a one-way performance measurement is part of a test session and may be omitted when only a two-way performance measurement test session is requested. The server 130 may be configured to retrieve one-way performance measurement data upon recognition of a test session including one-way performance measurements. The server 130 may also be configured to notify the control client 110 and/or the fetch client 120 of the data retrieval. The fetch client 120 may then be used to retrieve the data from the server 130.

Figure 2:
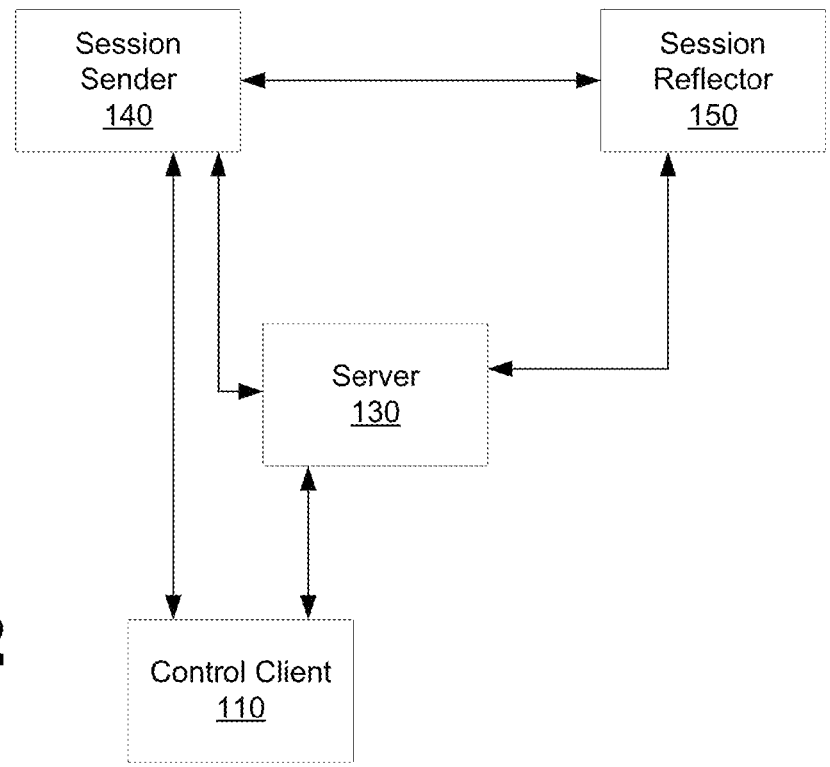
FIG. 2 is a block diagram illustrating another exemplary system for measuring network performance, according to one embodiment.

In certain embodiments, the fetch client 120 may be omitted. For example, FIG. 2 is a block diagram illustrating another exemplary system 200 for measuring network performance. The system 200 is a modification of the system 100 in which the fetch client 120 has been omitted. The fetch client 120 may be omitted from embodiments configured to collect two-way performance measurements. As described herein, response test packets can carry performance measurement data to the session sender 140, and the session sender 140 may be configured to obtain test session data from response test packets so that separate communications (e.g., fetch requests and retrievals) do not have to be used to obtain test session data. As a result, test sessions may be performed and performance metrics calculated in a manner that minimizes the test load placed on network resources.

C. Server

The server 130 may be configured to manage one or more performance test sessions, including test sessions between the session sender 140 and the session reflector 150. The server 130 can configure per-session states in test session end points such as the session sender 140 and the session reflector 150. For example, the server 130 may provide test schedules to the session sender 140 and the session reflector 150. The test schedules may be used to help the endpoints of a test session identify lost packets and other test session anomalies, as described in the OWAMP article.

The server 130 may be configured to instruct the session sender 140 to start transmitting streams of test packets to the session reflector 150. The server 130 may also provide the test packet streams to the session sender 140. In addition, the server 130 may be configured to receive or retrieve data descriptive of test sessions. Test session data may be extracted from test packets or retrieved from the session sender 140 and/or the session reflector 150. Exemplary test packets and data contained therein will be described in detail below.

With the server 130, test sessions can be conducted between any network elements with which the server 130 may establish communications. This provides flexibility for measuring network performance at many different locations in a network. A network operator may use the control client 110, the fetch client 120, and/or other programs to access the functionality of the server 130 to conduct, manage, and analyze test sessions between network elements.

D. Session Sender

The session sender 140 may be configured to function as a sending endpoint of a test session. Upon receiving a start-session command from either the server 130 or the control client 110, the session sender 140 may begin to transmit streams of test packets to the session reflector 150. The test packets transmitted from the session sender 140 to the session reflector 150 are referred to as sender test packets, which may be defined by the control client 110, the server 130, or the session sender 140. The sender test packets are typically in one of the forms described in the OWAMP article, which forms include a format for use in unauthenticated mode and another format for use in both authenticated mode and encrypted mode.

The sender test packets may be transmitted from the session sender 140 to the session reflector 150 as described in the OWAMP article. The sender test packets travel over one or more network segments toward the session reflector 150. The network segments may comprise any known transmission medium or media used to communicatively connect devices in which the session sender 140 and the session reflector 150 are implemented.

As described in greater detail below, the session reflector 150 may be configured to respond to every timely received valid sender test packet by defining and transmitting a response test packet to the session sender 140. Test packets defined and transmitted by the session reflector 150 to the session sender 140 may be referred to as response test packets. Several examples of response test packets will be described further below.

The session sender 140 may be configured to receive and process response test packets received from the session reflector 150. As response test packets are received, the session sender 140 may extract data from the packets and use the data to compute performance metrics, including two-way and/or certain one-way performance metrics. Any known method of computing performance metrics may be used, including using timestamp information contained in the response test packets to compute delay, jitter, or other measurements of performance. The session sender 140 may make the extracted data and/or the calculated performance metrics accessible to the server 130 and/or the control client 110.

By using data contained in response test packets to compute performance metrics, calculations can be performed at the session sender 140, the server 130, or the control client 110 upon receipt of the response test packets at the session sender 140. Consequently, certain embodiments can forego storing significant amounts of test data at the session reflector 150 for subsequent fetching, thereby conserving memory and bandwidth resources. Other embodiments may continue to record measurements at the session reflector 150 to allow for the obtaining of both one-way and two-way performance measurements.

E. Session Reflector

The session reflector 150 may be configured to function as a reflecting and/or receiving endpoint of a test session. As sender test packets are received from the session sender 140, the session reflector 150 may define and send a response test packet to the session sender 140 for every valid, timely received sender test packet. Together, the sender test packets and the response test packets provide a round trip stream of packets that allows for calculations of two-way performance metrics.

In certain embodiments, for each timely received sender test packet, the session reflector 150 may be configured to timestamp the received packet, copy information from the sender test packet (e.g., packet sequence number and the send timestamp associated with the sender test packet), and define and send a response test packet to the session sender 140. The session reflector 150 may be configured to insert any suitable information into the response test packets, including any of the information included in the exemplary response test packets described below. The session reflector 150 may also be configured to decrypt all or part of the information included in sender test packets and to encrypt all or part of the data inserted in the response test packets. Decryption and encryption depend on the mode (i.e., unauthenticated, authenticated, or encrypted) of the test session packets. Any suitable encryption and decryption technologies may be used, including such technologies known to those skilled in the art.

The session reflector 150 may be configured to perform certain actions upon receipt of untimely sender test packets. For example, when a sender test packet is received after expiration of a predetermined time or time interval, session reflector 150 may be configured not to generate a response test packet. Rather, the session reflector 150 may record receipt of and any data included in the "out-of-time" sender test packets, including sequence number, presumed send time, and time or receipt. The recorded data may be retrieved by the fetch client 120, as described above. The recordation of receipt of and data included in "out-of-time" sender test packets at the session reflector 150 can improve the accuracy of performance measurements by accounting for the "out-of-time" test packets, unlike conventional performance measurement protocols that ignore untimely packets.

Figure 3:
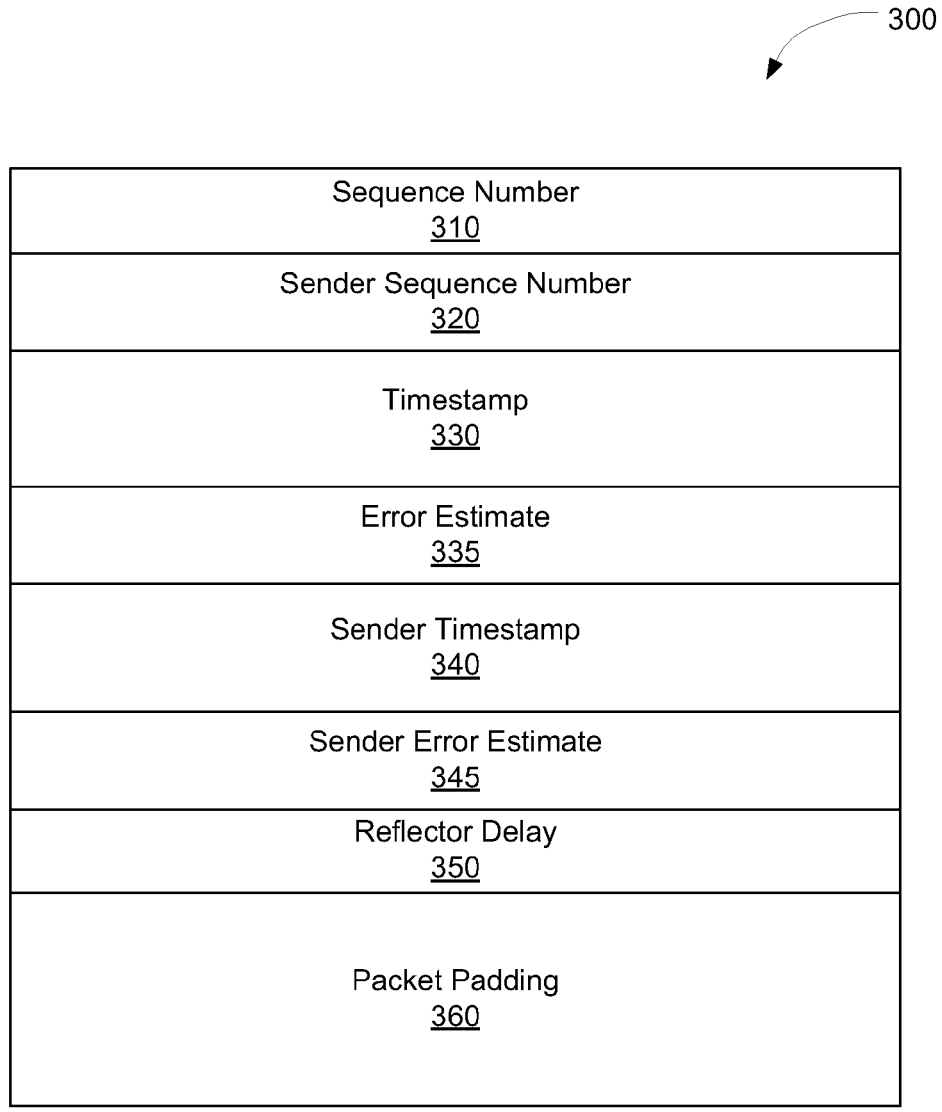
FIG. 3 is a representation of an exemplary test packet for use in either the system of FIG. 1 or the system of FIG. 2, according to one embodiment.

FIG. 3 is a representation of an exemplary response test packet 300 that may be defined by the session reflector 150 for transmission to the session sender 140, according to one embodiment. As shown in FIG. 3, the response test packet 300 may include a sequence number field 310, a sender sequence number field 320, a timestamp field 330, an error estimate field 335, a sender timestamp field 340, a sender error estimate field 345, a reflector delay field 350, and a packet padding field 360. The sequence number field 310 includes the sequence number of the response test packet. The sequence number typically begins with a "zero" value and is incremented for each subsequent response test packet defined by the session reflector 150. The sender sequence number field 320 includes the sequence number of the sender test packet transmitted by the session sender 140 that corresponds to the response test packet 300. The session reflector 150 can obtain a copy of the sender sequence number from the sender test packet for insertion into the corresponding response test packet. The timestamp field 330 includes a timestamp associated with the time at which the response test packet 300 was transmitted by the session reflector 150. The sender timestamp field 340 includes a timestamp associated with the time at which the corresponding sender test packet was transmitted by the session sender 140. The session reflector 150 can obtain a copy of the sender time stamp from the sender test packet for insertion into the corresponding response test packet. The reflector delay field 350 includes data representative of the amount of time between reception of a sender test packet and transmission of the corresponding response test packet 300, which amount of time is referred to as reflector delay. The reflector delay may by used to remove session-reflector transition delay from round-trip performance calculations. The packet padding field 360 may be used as known in the art to pad the response data packet 300.

The error estimate field 335 and the sender error estimate field 345 may be in the formats described in the OWAMP article and may include error estimates as will be understood by those skilled in the art. The session reflector 150 can obtain a copy of the sender error estimate from the sender test packet for insertion into the corresponding response test packet.

The format represented by the exemplary response test packet 300 of FIG. 3 may be used in unauthenticated mode. A different format may be used for response test packets in authenticated and encrypted modes. Unauthenticated, authenticated, and encrypted modes are described in the OWAMP article.

Figure 4:
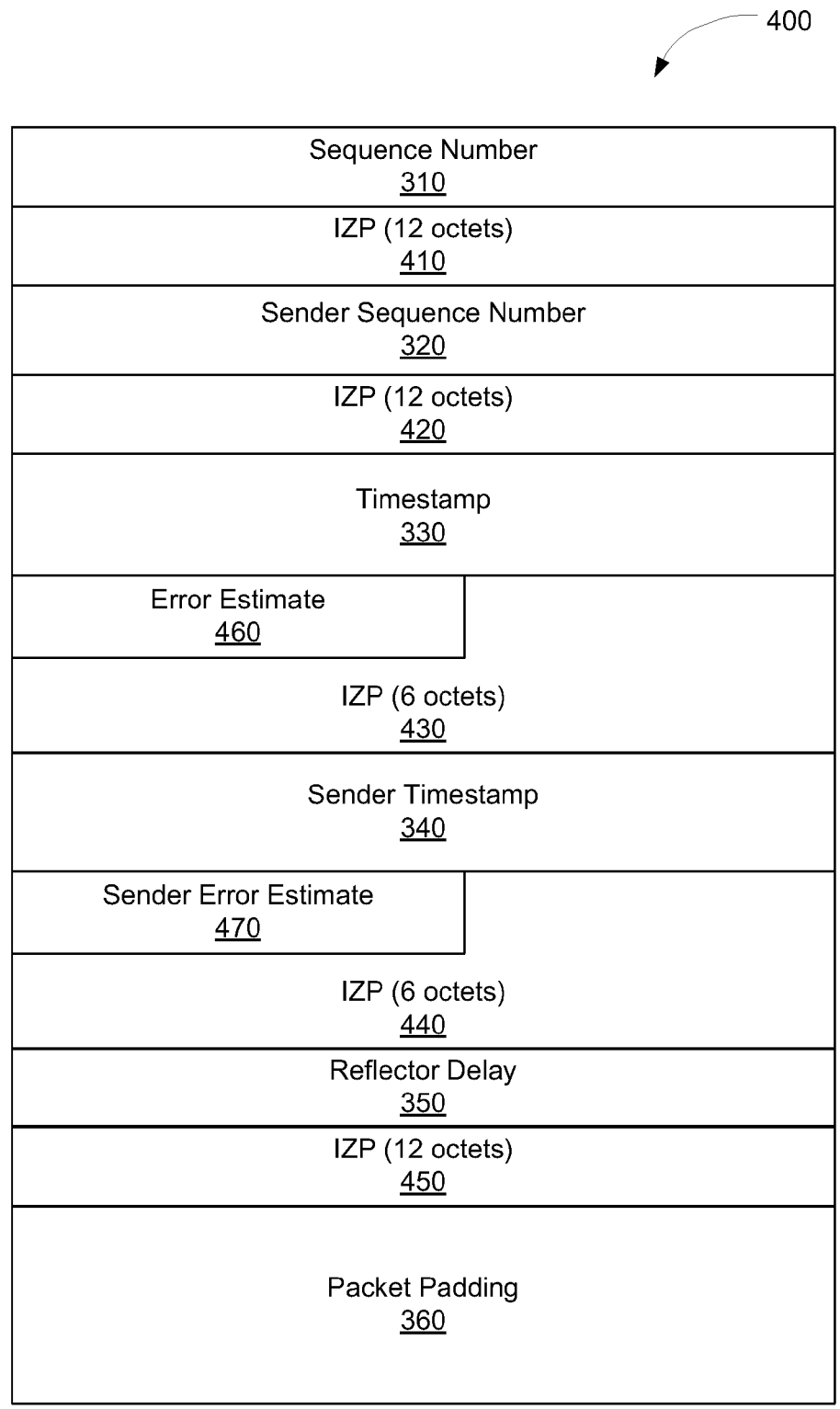
FIG. 4 is a representation of another exemplary test packet for use in either the system of FIG. 1 or the system of FIG. 2, according to one embodiment.

FIG. 4 is a representation of another exemplary test packet 400 that may be used in authenticated mode and encrypted mode, according to one embodiment. As shown in FIG. 4, the response test packet 400 may include the sequence number field 310, the sender sequence number field 320, the timestamp field 330, the sender timestamp field 340, the reflector delay field 350, and the packet padding field 360. In addition, the response test packet 400 may include Integrated Zero Padding ("IZP") fields 410, 420, 430, 440, and 450, which may be used as known in the art or as described in the OWAMP article to authenticate or encrypt and decrypt test packets. Any of the IZP fields 410, 420, 430, 440, and 450 may include error estimates, as known to those skilled in the art. In FIG. 4, IZP fields 430 and 440 contain error estimate subfields 460 and 470.

In certain embodiments, a minimum data segment length for a response test packet such as response test packet 300 is approximately thirty-six octets for unauthenticated mode, and a minimum data segment length for a response test packet such as response test packet 400 is approximately eighty octets for authenticated and encrypted modes. Packet data may be encrypted and decrypted in any of the ways described in the OWAMP article, or in any way known to those skilled in the art.

While response test packet format may be the same for authenticated and encrypted modes, in certain embodiments, in encrypted mode, the session reflector 150 is configured to encrypt both sequence numbers and timestamps to maximize data integrity and security. In authenticated mode, the session reflector 150 may be configured to encrypt only a portion of the packet data. For example, the sequence numbers may be encrypted without encrypting the timestamp data. Accordingly, timestamp data may be transmitted in unencrypted form to reduce reflector delay by minimizing encryption operations. This may help to improve accuracy of performance measurements in certain conditions by minimizing reflector delay. This is especially useful in cases in which the session reflector 150 can encrypt a sequence number before a timestamp is fetched. In certain embodiments, a first portion (e.g., approximately thirty-two octets) of each test packet is encrypted in authenticated mode using Advanced Encryption Standard "AES" Electronic Cookbook ("ECB") operations, which are well-known in the art.

In certain embodiments, in addition to being configured to define and transmit response test packets to the session sender 140, the session reflector 150 may be further configured to record information obtained from sender test packets received from the session sender 140, as described in the OWAMP article. The recorded information may be retrieved using the fetch client 120, as described above. Accordingly, the session reflector 150 may be configured to function to support both one-way and two-way performance measurements.

IV. Exemplary System Implementations

The system 100 of FIG. 1 and the system 200 of FIG. 2 may be implemented in a variety of different hardware configurations for use in measuring network performance. In certain embodiments, for example, the server 130, the session sender 140, and the session reflector 150 may each be implemented in a separate physical entity. For example, the server 150 may be implemented on a server device, the session sender 140 may be implemented on a first network element, and the session reflector 150 may be implemented on a second network element. In such embodiments, the server 130 may communicate with the network elements using known protocols and technologies (e.g., any protocol and technology for communicating over the Internet), and the network elements may communicate with each other over one or more network segments under test. The control client 140, the fetch client 150, and other client programs may be implemented on one or more separate devices, such as any known client device that can be configured to communicate with the server 130.

Figure 5:
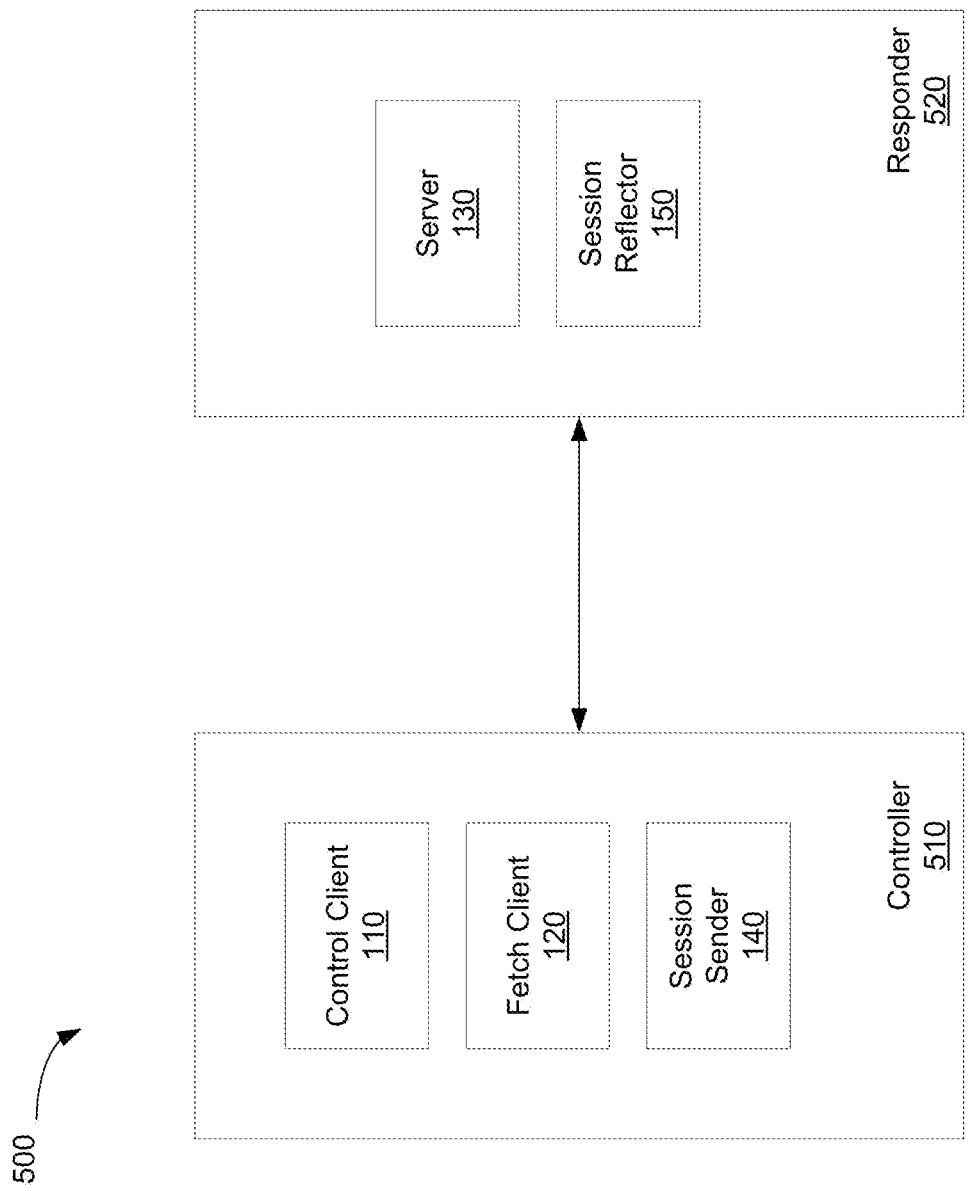
FIG. 5 is a block diagram of an exemplary implementation of the system of FIG. 1, according to one embodiment.
Figure 6:
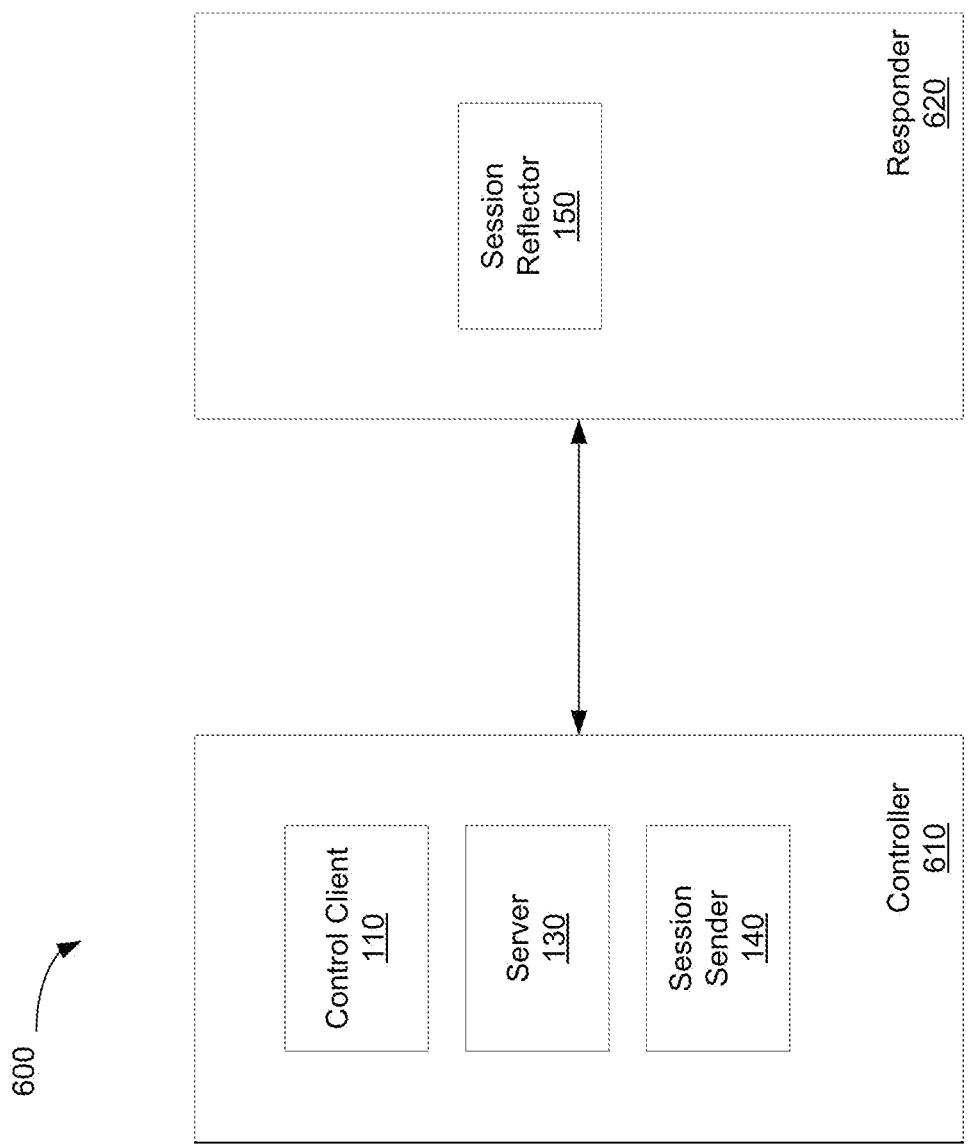
FIG. 6 is a block diagram of an exemplary implementation of the system of FIG. 2, according to one embodiment.

Of course, the systems 100 and 200 are not limited to any particular hardware implementation. FIGS. 5 and 6 are block diagrams illustrating exemplary implementations 500 and 600 of the system 100 and the system 200, respectively. As shown in FIG. 5, the system 500 may be implemented on two host devices, which are referred to as a controller 510 and a responder 520. In the implementation 500 of FIG. 5, the controller 510 includes the control client 110, the fetch client 120, and the session sender 140, while the responder 520 includes the server 130 and the session reflector 150.

In the implementation 500 of FIG. 5, any suitable control protocol may be used to establish test sessions between the controller 510 and the responder 610. In certain embodiments, control messages are transmitted out-of-band to enhance the reliability and capability of control and monitoring functions, as described above.

The controller 510 and the responder 520 may be in communication by one or more protocols and/or channels of communication. In many embodiments, communications between the controller 510 and the responder 520 are sent over one or more segments of a communications network, such as the Internet, for example. The control client 110, the fetch client 120, the server 130, the session sender 140, and the session reflector 150 may each function as described above to perform test sessions over the one or more network segments connecting the controller 510 and the responder 520.

The implementation 500 of FIG. 5 may support the collection of both two-way and one-way performance measurements. The measurements may be obtained from the response test packets. One-way performance measurement data may also be retrieved from the responder 520 using the fetch client 120, as described above.

The controller 510 may comprise a first network element, and the responder 520 may comprise a second network element connected to the first network element by one or more network segments. The controller 510 and the responder 520 may comprise any network elements, including, but not limited to, routers, switches (including Layer-2, Layer-3, and multi-Layer switches), bridges, multiplexers, demultiplexers, packet filters, gateways (e.g., VoIP gateways or IP/PSTN gateways), end-user devices, cellular telephones, personal digital assistants, laptop computers, desktop computers, network interface cards, modems, personal computers, dedicated computer devices, gaming stations, e-mail enabled devices, satellite pagers, Internet devices, embedded computers, video phones, mainframe computers, mini-computers, programmable logic devices, vehicles, kiosks, entertainment devices, media devices, set-top boxes, televisions, landline telephones, SIP telephones, wireless communication devices, non-wireless communication devices, text messaging devices, multimedia devices, and any other device that may be communicatively connected to another device via one or more segments of a communications network.

FIG. 6 illustrates the implementation 600, which is an exemplary implementation of the system 200 on two host devices. Again, the two host devices are referred to as a controller 610 and a responder 620, which may comprise or be in the form of any of the network elements mentioned above. As shown in FIG. 6, the controller 610 may include the control client 110, the server 130, and the session sender 140, while the responder 620 may include the session reflector 150. The implementation 600 is especially advantageous when a network device under test (e.g., the responder 620) has limited capacity (e.g., limited memory or limited processing unit resources) or when bandwidth to or from the device under test is limited, because the processing performed by and the number of communications with the device under test are minimized. In particular, the session reflector 150 can be configured simply to respond to sender test packets by defining and transmitting response test packets, as described above. Consequently, processing power and other network resources are conserved by limiting the number and complexity of operations executed by the responder 620. In addition, testing can be performed without having to transmit control messages between the controller 610 and the responder 620. Instead, the responder 620 may be configured to recognize sender test packets regardless of state of the responder 620 (i.e., stateless) and to respond by generating response test packets as described above.

Accordingly, the system 600 of Figure provides for a lightweight implementation of network performance monitoring capabilities. The lightweight performance monitoring capabilities can be implemented as software processes or software embedded in hardware on a wide variety of computing devices, including portable or lightweight consumer devices such as set-top boxes, remote sensors, televisions, personal digital assistants, wireless devices, mobile telephones, and any of the devices listed above.

V. Exemplary Process View

Figure 7:
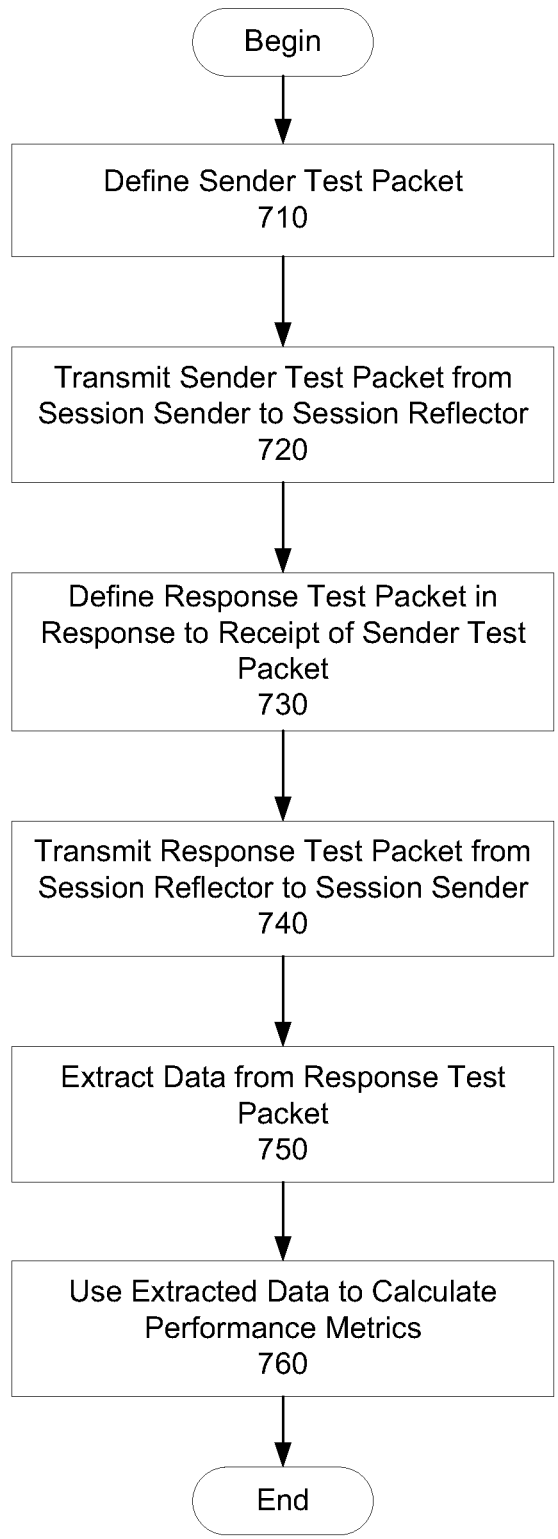
FIG. 7 is a flowchart illustrating an exemplary method for measuring network performance, according to one embodiment.

FIG. 7 is a flowchart illustrating an example of a process for measuring network performance, according to one embodiment. While FIG. 7 illustrates exemplary steps according to one embodiment, other embodiments may omit, add to, and/or modify any of the steps shown in FIG. 7.

The process of FIG. 7 begins by defining a sender test packet at step 710. The sender test packet may be in any form described above. At step 720, the sender test packet is transmitted from the session sender 140 to the session reflector 150. At step 730, a response test packet, such as response test packet 300 or 400, is defined by the session reflector 150 in response to receipt of the sender test packet.

At step 740, the response test packet is transmitted from the session reflector 150 to the session sender 140. Step 740 may be performed in any of the ways described above. At step 750, data is extracted from the response test packet. Step 750 may include extracting timestamp data and may be performed by the session sender 140, the server 130, or a client program such as client control 110.

At step 760, the extracted data is used to calculate performance metrics. Step 760 may include using timestamp data to calculate jitter and delay, for example. Step 760 may be performed by the session sender 140, the server 130, or a client program such as client control 110.

With the systems and methods described herein, performance metrics can be calculated without imposing significant communications or processing burdens on a responding network device. Accordingly, network performance can be monitored with minimal loads being imposed on network elements and links. In addition, the systems and methods are flexible and can be implemented in a wide variety of communication networks, protocols, and architectures.

VI. Alternative Embodiments

The preceding description has been presented only to illustrate and describe embodiments of the invention. It is not intended to be exhaustive or to limit the invention to any precise form disclosed. The invention may be practiced otherwise than is specifically explained and illustrated without departing from its spirit or scope. It is intended that the scope of the invention be defined by the following claims.

What is claimed is:

1. A system comprising:
a session sender configured to define and transmit a sender test packet; and
a session reflector communicatively coupled to said session sender and configured to:
receive said sender test packet from said session sender,
determine whether said sender test packet is received by a predetermined time, and
upon a determination that said sender test packet is received by said predetermined time,
define a response test packet, and
transmit said response test packet to said session sender, said response test packet being defined to include data for calculating at least one two-way performance metric, and, upon a determination that said sender test packet is received after expiration of said predetermined time, identify the sender test packet as an out-of-time sender test packet, and not generate said response test packet to the out-of-time sender test packet.

2. The system of claim 1, wherein said session reflector is further configured to record information for calculating at least one one-way performance metric.

3. The system of claim 2, further comprising:
a server communicatively coupled to said session reflector; and
a fetch client communicatively coupled to said server, said fetch client being configured to retrieve said recorded information from said session reflector independently of the transmission of said response test packet from said session reflector to said session sender.

4. The system of claim 3, wherein said session sender, said session reflector, and said server comprise separate physical devices.

5. The system of claim 1, wherein said session reflector is configured to record said information in response to the determination that said sender test packet is received after said predetermined time.

6. The system of claim 1, wherein said session reflector is configured to encrypt a subset of said data included in said response test packet.

7. The system of claim 6, wherein said data includes at least one sequence number and at least one timestamp, said session reflector being configured to encrypt said at least one sequence number and not encrypt said at least one timestamp.

8. The system of 1, further comprising:
a server communicatively coupled to said session reflector; and
a control client communicatively coupled to said server, said control client and said server being configured to establish a test session between said session sender and said session reflector, and control said test session, said control client and said server being configured to establish and control said test session using out-of-band control messages.

9. The system of claim 1, wherein said session reflector is configured to receive said sender test packet and to define and transmit said response test packet without assistance from a test control protocol.

10. A system comprising:
a session sender configured to define and transmit a sender test packet;
a session reflector communicatively coupled to said session sender and configured to:
receive said sender test packet from said session sender,
define a response test packet if said sender test packet was received within a predetermined time, the system being configured to not define or transmit a response test packet if said sender test packet was not received within the predetermined time,
transmit said response test packet to said session sender, said response test packet being defined to include data for calculating at least one two-way performance metric, and
record information for calculating at least one one-way performance metric based at least in part on said sender test packet regardless of whether said sender test packet was received within the predetermined time;
a server communicatively coupled to said session reflector; and
a fetch client communicatively coupled to said server, said fetch client being configured to retrieve said recorded information from said session reflector independently of the transmission of said response test packet from said session reflector to said session sender.

11. The system of claim 10, wherein said session sender, said session reflector, and said server comprise separate physical devices.

12. The system of claim 10, further comprising a control client communicatively coupled to said server, said control client and said server being configured to:
establish a test session between said session sender and said session reflector, and
control said test session, said control client and said server being configured to establish and control said test session using out-of-band control messages.

13. A method comprising:
transmitting a sender test packet from a first network element to a second network element;
receiving the sender test packet at the second network element;
determining whether the sender test packet is received within a predetermined time;
upon a determination that the sender test packet is received by the predetermined time,
defining, at the second network element, a response test packet, said defining step including inserting data for calculating at least one two-way performance metric;
transmitting the response test packet from the second network element to the first network element; and
upon a determination that said sender test packet is received after expiration of said predetermined time,
identifying the sender test packet as an out-of-time sender test packet; and
not generating a response to the out-of time sender test packet.

14. The method of claim 13, further comprising:
recording, at the second network element, information for calculating at least one one-way performance metric associated with transmission of the sender test packet from the first network element to the second network element; and
remotely retrieving, from the second network element, the information recorded at the second network element, said retrieving being performed independently of said transmitting step.

15. The method of claim 14, wherein said recording and said retrieving steps are performed in response to said determining step determining that the sender test packet is received after the predetermined time.

16. The method of claim 14, further comprising:
using the data included in the response test packet to calculate the at least one two-way performance metric; and
using the information recorded at the second network element to calculate the at least one one-way performance metric.

17. The method of claim 13, further comprising encrypting a subset of the data included in the response test packet.

18. The method of claim 17, wherein the data includes at least one sequence number and at least one timestamp, said encrypting step including encrypting the at least one sequence number and not encrypting the at least one timestamp.

19. The method of 13, further comprising:
establishing a test session between the first network element and the second network element; and
controlling the test session, said establishing and said controlling steps including using out-of-band control messages.

20. The method of claim 13, wherein the sender test packet and the response test packet are transmitted between the first network element and the second network element without assistance from a control protocol.

21. A method, comprising:
measuring network performance by:
defining a sender test packet within said network;
transmitting said sender test packet from a session sender within said network to a session reflector within said network;
defining a response test packet within said network in response to receipt by said session reflector of said sender test packet;
transmitting said response test packet from said session reflector to said session sender;
extracting data from said response test packet; and
using said extracted data to calculate metrics reflecting two-way and/or certain one-way performance of said network;
wherein said session sender is configured to function as a sending endpoint of a test session and said session reflector is configured to function as a reflecting and/or receiving endpoint of said test session; and
wherein said session reflector defines and sends said response test packet to said session sender for every valid sender test packet timely-received by said session reflector, decrypts all or part of information included in said every valid and timely-received sender test packet, encrypts all or part of data inserted into said response test packet and records untimely-received sender test packets to improve accuracy of performance measurements of said network.

* * * * *